United States Patent

[11] 3,566,018

[72] Inventor Albert Macovski
Palo Alto, Calif.

[21] Appl. No. 804,747
[22] Filed Mar. 6, 1969
[45] Patented Feb. 23, 1971
[73] Assignee RCA Corporation

[54] COLOR TELEVISION SIGNAL GENERATING SYSTEM
17 Claims, 12 Drawing Figs.

[52] U.S. Cl. .......... 178/5.4, 350/162, 350/169
[51] Int. Cl. .......... H04n 9/06
[50] Field of Search .......... 178/5.4 (STC), 5.4 (F), 5.4; 325/329, 330, 49; 350/169, 162

[56] References Cited
UNITED STATES PATENTS

| | | | |
|---|---|---|---|
| 2,733,291 | 1/1956 | Kell | 178/5.4(STC) |
| 3,378,633 | 4/1968 | Macovski | 178/5.4(STC) |
| 3,419,672 | 12/1968 | Macovski | 178/5.4(STC) |
| 3,470,310 | 9/1969 | Shashoua | 178/5.4 |

*Primary Examiner*—Richard Murray
*Assistant Examiner*—Richard P. Lange
*Attorney*—Eugene M. Whitacre

ABSTRACT: Light from a colored subject is projected onto the photosensitive electrode of a camera tube through a spatial color encoding filter grating including strips of subtractive color material equally transmissive of white light so that scansion of the electrode by an electron beam produces in the camera tube output color difference signals as amplitude modulations of different phases of a single suppressed carrier wave, the envelopes of which are subject to polarity ambiguities because of the suppression of the wave. A constant intensity light, which is modified by an auxiliary signal encoding filter grating, is projected onto the photosensitive camera tube electrode so that the interaction between the light passing through the two gratings produces a plurality of unmodulated waves of different frequencies in the camera tube output. Selected ones of these unmodulated waves are mixed to produce a reference wave of fixed amplitude and phase at the color carrier frequency and are applied to synchronous detectors in such phases as to recover the color difference signals from the phase modulated color carrier wave with no polarity ambiguities.

Fig. 1.

INVENTOR
ALBERT MACOVSKI
BY Eugene M. Whitacre
ATTORNEY

INVENTOR
ALBERT MACOVSKI
BY Eugene M. Whitacre
ATTORNEY

INVENTOR
ALBERT MACOVSKI

BY Eugene M. Whitacre
ATTORNEY

COLOR TELEVISION SIGNAL GENERATING SYSTEM

BACKGROUND OF THE INVENTION

Systems employing a camera tube provided with spatial filter gratings for producing color television video signals have previously been proposed as illustrated in U.S. Pat. No. 2,733,291 granted to R. D. Kell on Jan. 31, 1956 and in U.S. Pat. No. 3,378,633 granted to A. Macovski on Apr. 16, 1968. The color filter gratings used in such systems comprise, for example, strips of subtractive color selective filter material spaced apart by strips of transparent material. When light from a colored subject is projected onto the photosensitive electrode of the camera tube through the filter gratings, a color representative video signal is generated by scanning the electrode with an electron beam. The generated video signal is in the form of an amplitude modulated carrier wave, the frequency of which depends upon the number of filter strips and the beam scanning rate, and the amplitude of which depends upon the intensity of the particular color light from the subject which is transmitted through the color selective filter material.

As taught in the Macovski patent, for example, the color encoding filter consists of two gratings, one of which has a first set of strips of material capable of blocking red light and of passing substantially all of the light of other colors alternating with a second set of transparent strips; and the other of which has a first set of strips of material capable of blocking blue light and of passing substantially all of the light of other colors alternating with a second set of transparent strips. The two gratings are mounted in such relation to one another and to the photosensitive electrode of the camera tube that the scansion by the electron beam of the respectively corresponding electrode areas produces in the camera tube output one carrier wave having a first frequency and modulated in amplitude by red subject light representative signals and another carrier wave having a different frequency and modulated in amplitude by blue subject light representative signals. The average light projected onto the photosensitive camera tube electrode produces in the camera tube output a relatively low frequency band of luminance or Y signals. In order to develop "color difference" signals (such as R-Y and B-Y for example) for transmission and/or reproduction of a color picture from the Y and red and blue signals R and B, the respective red and blue signal modulated carrier waves derived from the camera tube output are detected and the recovered red and blue signals R and B are matrixed with the derived Y signal to produce the desired (R-Y) and (B-Y) color difference signals.

It has been found that color difference signals may be derived directly from the camera tube, thereby obviating the use of a matrixing network to produce such signals as in the systems such as represented by the Kell and Macovski patents referred to. This is accomplished by using material for the color selecting strips of the color signal encoding filter grating which passes all colors except the one desired for the color difference signal and by interspersing such color selective strips with strips of neutral gray material in place of the previously used transparent material. It is only necessary that the gray and color selective strips of the gratings transmit white light with equal intensity. By making one filter grating of alternate cyan and gray strips to produce a first frequency, a red color difference signal (R-Y) is generated as an amplitude modulation of a carrier wave having such first frequency. A blue color difference signal (B-Y) is similarly generated as an amplitude modulation of a carrier wave having a second frequency by means including a filter grating of alternate yellow and gray strips. Unlike the systems in which the alternating strips are transparent, the use of the gray strip material results in the production of no carrier wave in response to neutral, or uncolored, areas of the subject. Hence, the color difference signals (R-Y) and (B-Y) are encoded on two different suppressed carrier waves. The two color difference signals may be separately recovered by envelope detection of the two modulated carrier waves, but it must then be determined whether the recovered signals should be of positive or negative polarity. In other words, there is a polarity ambiguity which must be resolved in order to make proper use of the recovered signals.

In a copending application of A. Macovski having Ser. No. 517,638, filed Dec. 30, 1965 and entitled Filter for Encoding Color Difference Signals, there is disclosed a two carrier wave color difference signal arrangement and facilities for resolving the polarity ambiguities of the resultant color difference signals. The production of the two carrier waves at respectively different frequencies, however, requires the use of an appreciable portion of the camera tube frequency spectrum.

It is the object of the present invention to provide a system for producing unambiguous color difference signals derived from a television camera tube which uses a smaller portion of the camera tube frequency spectrum than in previously proposed systems.

In accordance with the present invention, there is provided a color difference signal encoding filter grating of such a character that, when light from a colored subject is projected through it onto the photosensitive electrode of the camera tube and this electrode is scanned by an electron beam, there is produced in the camera tube output the sidebands of a single suppressed carrier wave, the sidebands being modulated in at least two phases representative respectively of the desired color difference signals. In order to unambiguously recover the color difference signals, light from a constant intensity source is passed through an auxiliary signal encoding filter grating by which it is modified at such a frequency that the projection of the modified light through the color difference signal encoding grating onto the photosensitive camera tube electrode causes such interaction between the light passing through the two gratings that there is also produced in the camera tube output a number of unmodulated waves having frequencies which are combined to generate an unmodulated reference wave of known phase and having the frequency of the color carrier wave. Different phases of the reference wave are used to synchronously detect the color difference signals from the suppressed carrier amplitude modulated color carrier wave without any polarity ambiguity.

For a more complete disclosure of the invention, reference may be had to the following detailed description of several illustrative embodiments thereof which is given in conjunction with the accompanying drawings, of which:

Figures 1, 5:
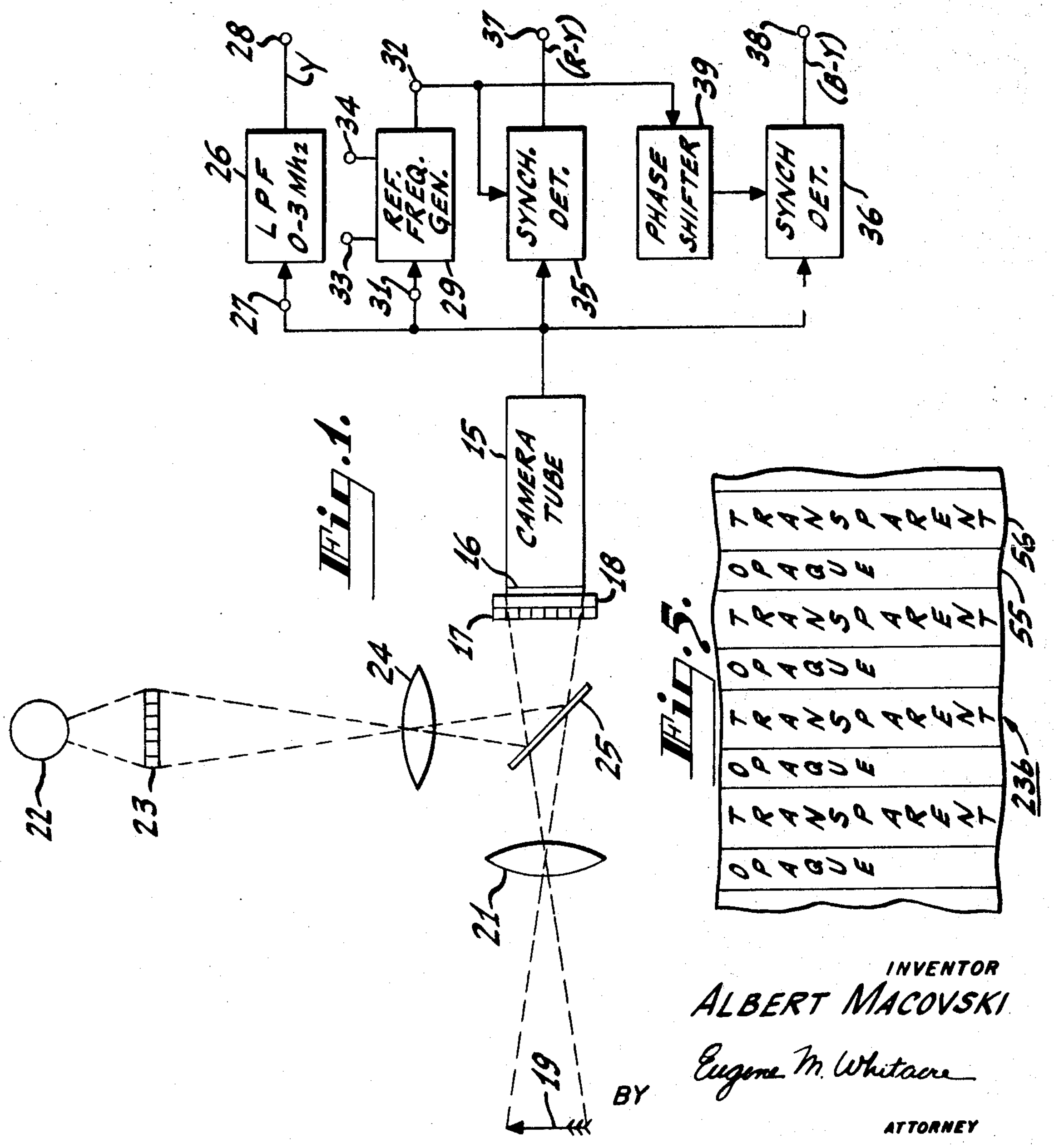
FIG. 1 is a diagrammatic representation of the arrangement of the optical and electrical components of a system embodying the invention.
FIG. 5 is a fragmentary portion, greatly enlarged, of another form of an auxiliary signal encoding filter grating used to modify colored light from a constant intensity light source.
Figure 8:
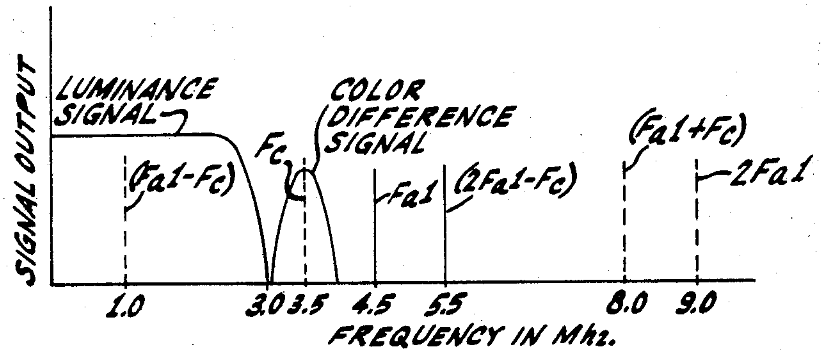
FIG. 8 is a graph illustrating the frequency spectrum including the waves produced by the use of either of the color difference signal encoding filter gratings of FIGS. 2 and 3 with the auxiliary signal encoding filter grating of FIG. 5.
Figure 9:
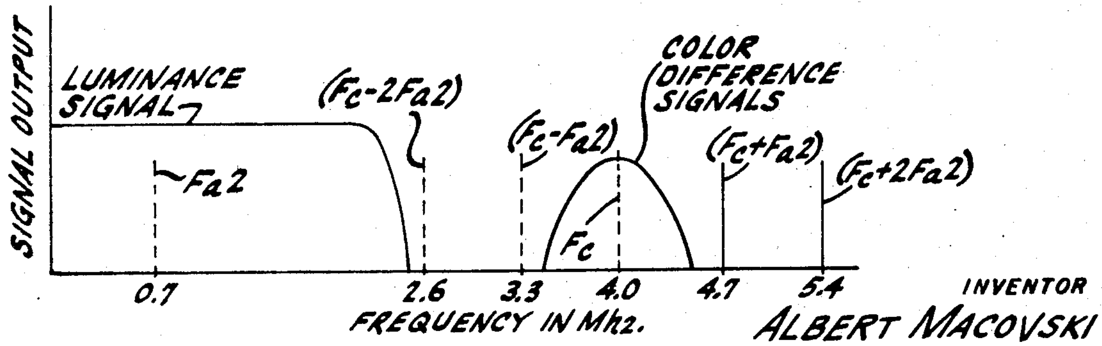
FIG. 9 is a graph illustrating the frequency spectrum including the waves produced by the use of either of the color difference signal encoding filter gratings of FIGS. 2 and 3 with the auxiliary signal encoding filter grating of FIG. 6.
Figures 10, 12:
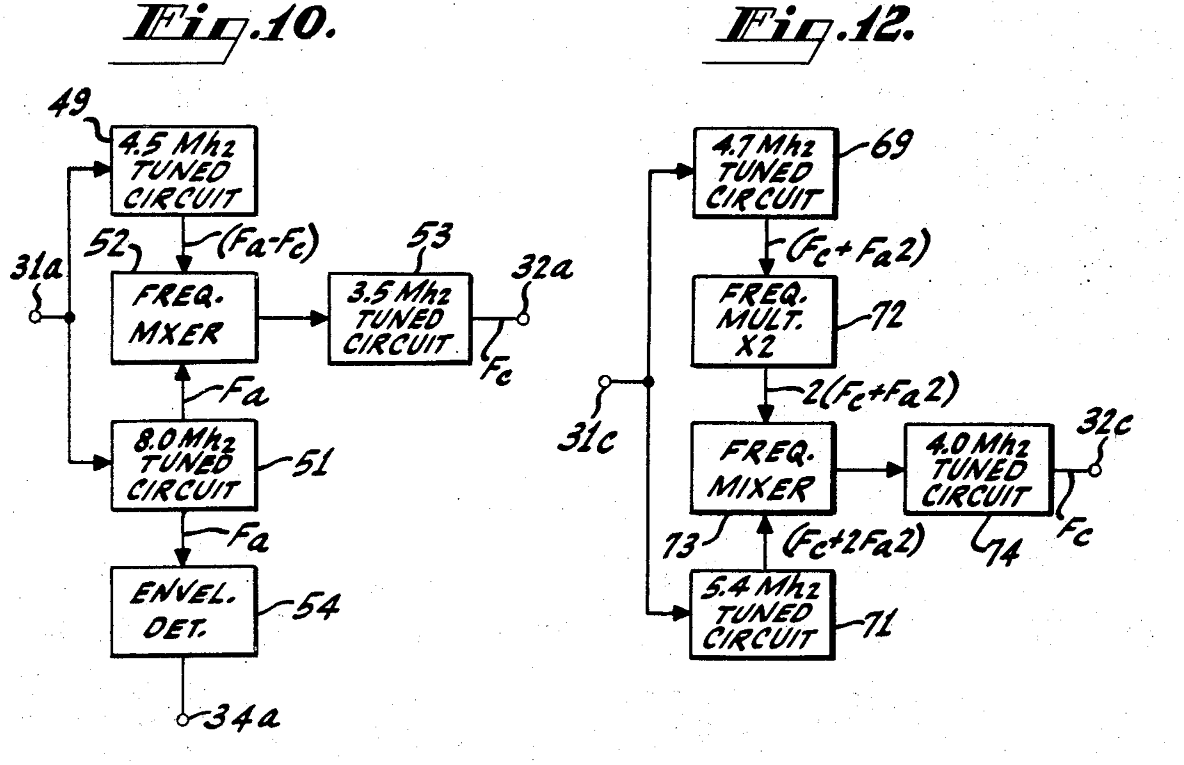
FIG. 10 is a block circuit diagram of the reference frequency generator of FIG. 1 to produce a synchronous demodulating reference frequency wave from the waves of the frequencies depicted in FIG. 7.
Figure 11:
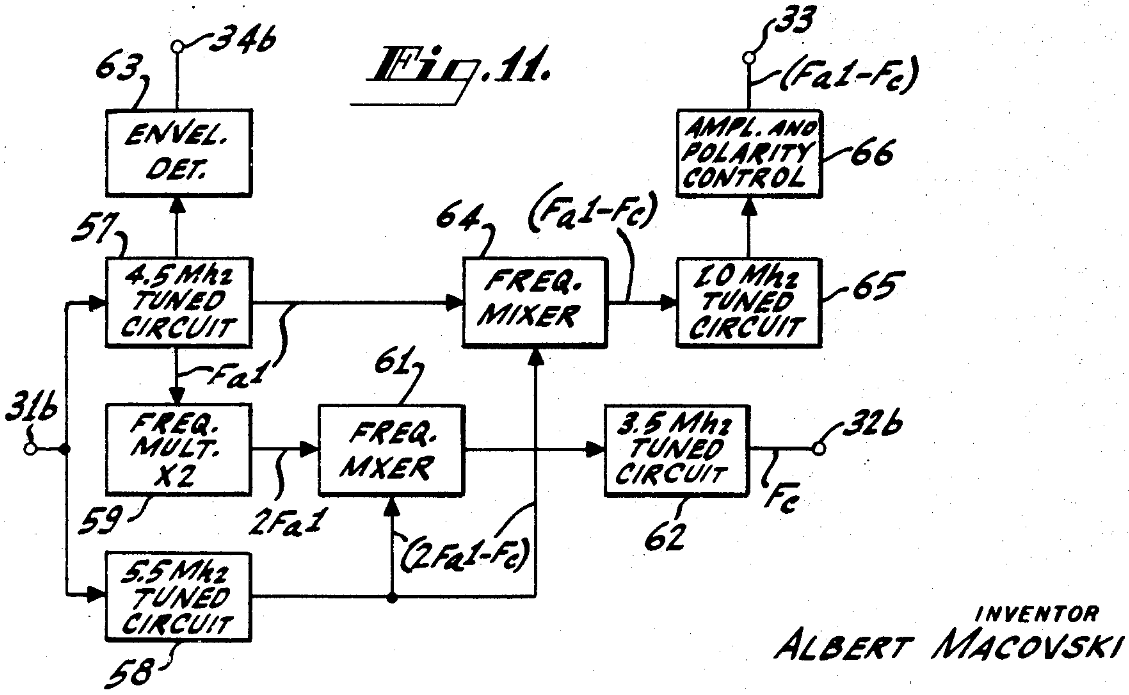

FIG. 11 is a block circuit diagram of the reference frequency generator of FIG. 1 to produce a synchronous demodulating reference frequency wave from the waves of the frequencies depicted in FIG. 8; and FIG. 12 is a block circuit diagram of the reference frequency generator of FIG. 1 to produce a synchronous demodulating reference frequency wave from the waves of the frequencies depicted in FIG. 9.

DETAILED DESCRIPTION OF THE INVENTION

In FIG. 1 a color television camera includes a pickup tube 15, such as a vidicon for example, having an internally formed photosensitive electrode 16 and a spatial color difference signal encoding filter grating 17 located, in this case, externally either in direct contact with the faceplate 18 of the tube or optically arranged to transmit light from sources including a colored subject 19 by suitable means including a primary optical system 21. Although forming no part of the present invention, it is to be understood that the filter grating 17 may have other locations such as internally of the camera tube 15, for example. The general character of the filter grating 17 is similar to those disclosed in the Kell and Macovski patents previously referred to, but incorporating other features by which to produce color difference signals, for example, modulated on a single suppressed carrier wave. These features will be described subsequently in conjunction with FIGS. 2 and 3. The camera tube 15 has a conventional electrode structure and other apparatus (not shown) by which to scan the photosensitive electrode 16 so that video signals representative of the luminance and color information of the subject 19 are derived from the tube, together with auxiliary signals produced for use with this invention.

Figures 6, 7:
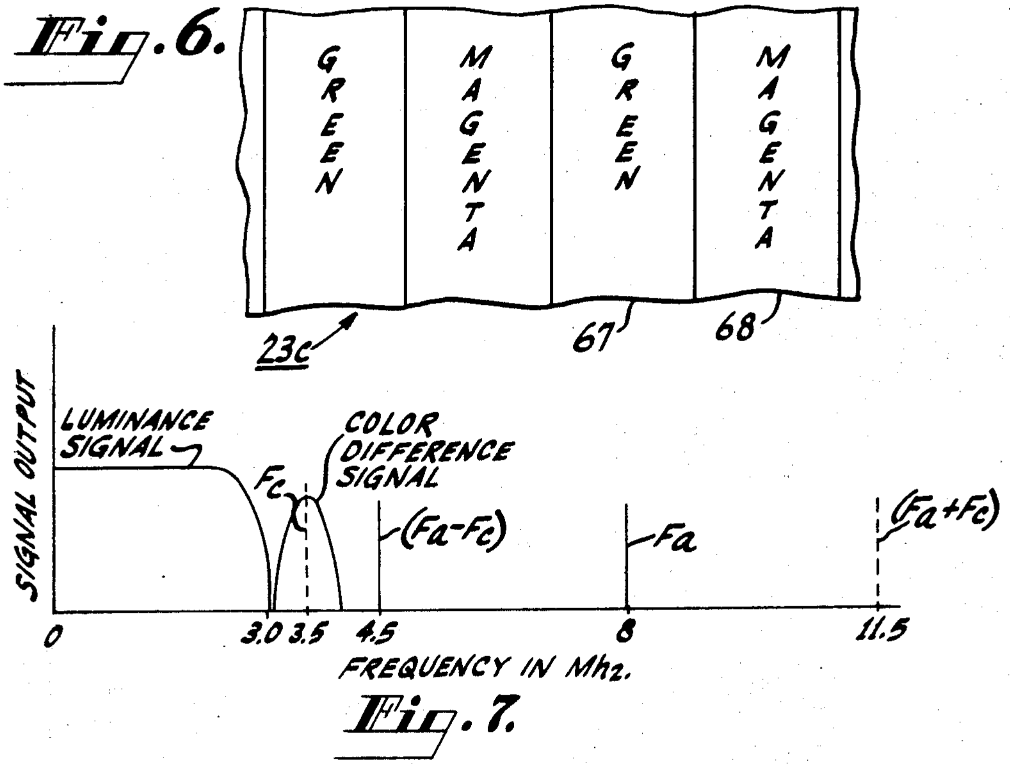
FIG. 6 is a fragmentary portion greatly enlarged, of a form of an auxiliary signal encoding filter grating used to modify white light from a constant intensity light source.
FIG. 7 is a graph illustrating the frequency spectrum including the waves produced by the use of either of the color difference signal encoding filter gratings of FIGS. 2 and 3 with the auxiliary signal encoding filter grating of FIG. 4.

In order to produce such auxiliary signals there is provided a constant intensity light source 22, the light from which may be white or colored, as will be explained later, and is modified by an auxiliary signal encoding grating 23 for projection, by means including an auxiliary optical system 24 and a half-silvered mirror 25, through the color difference signal encoding filter grating 17 onto the photosensitive electrode 16 of the camera tube 15. The interaction between the subject-derived light and the modified light from the source 22 which is caused by the passage through the color difference signal encoding filter grating 17 produces a complex light pattern focused on the photosensitive electrode 16 of the camera tube 15 so that the electron beam scansion of this electrode develops in the camera tube output (1) relatively low frequency band of luminance signals derived from the average of all of the light projected onto the electrode, (2) the sidebands of the suppressed color carrier wave modulated by the desired color difference signals, and (3) a plurality of unmodulated waves of various frequencies as represented in FIGS. 7, 8 and 9 which will be referred to in detail subsequently.

The output of the camera tube 15 of FIG. 1 is coupled (1) to a low pass filter 26 having input and output terminals 27 and 28, respectively; (2) to a reference frequency generator 29 having input and output terminals 31 and 32, respectively, and also two compensating signal output terminals 33 and 34; and (3) to first and second synchronous detectors 35 and 36 having respective output terminals 37 and 38. The luminance signal is developed at the output terminal 28 of the filter 26. The output terminal 32 of the reference frequency generator 29, at which is developed the proper phase of the reference frequency wave for synchronous demodulation of one of the color difference signals, is coupled to the synchronous detector 35 so as to produce at the output terminal 37 the (R-Y) color difference signal, for example, with no polarity ambiguity. The output terminal 32 of the reference frequency generator 29 also is coupled through a phase shifter 39 to apply the proper phase of the reference frequency wave to the synchronous detector 36 so that there is produced at the output terminal 38 the (B-Y) color difference signal, for example, with no polarity ambiguity. The amount of phase shifting effected by the phase shifter depends upon the particular configuration of the color difference signal encoding filter grating 17 used for the development of such signals.

Figure 2:
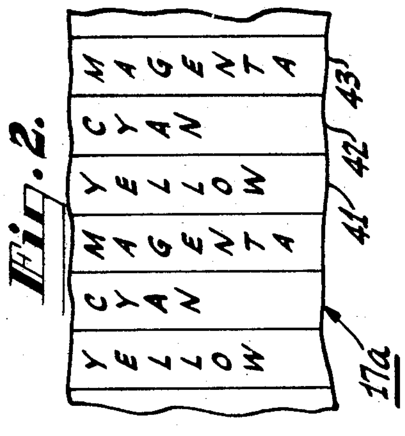
FIG. 2 is a fragmentary portion, greatly enlarged, of one form of a color difference signal encoding filter grating used in the production of color difference signals at 120° phases of the color carrier wave.

In FIG. 2 the color difference signals encoding filter grating 17*a* comprises a plurality of regularly repeating sets of parallel strips, all of which are subtractive color selective and oriented to extend perpendicular to the line scanning direction of the electron beam. In the grating 17*a* the strips are yellow, cyan and magenta 41, 42 and 43, respectively, all of which transmit white light with equal intensity so that, for neutral or uncolored portions of the subject, no carrier wave is produced in the camera tube output. The principle is the same as that taught in the two-frequency system of the copending Macovski application Ser. No. 517,638, filed Dec. 30, 1965. In the present case, however, the resultant signal obtained from the camera tube output is a single phase and amplitude modulated suppressed carrier wave in which the color difference signals appear at different phases of the sidebands around the suppressed carrier wave frequency. When the filter grating 17*a* has strips of equal width, the (B-Y) color difference signal produced by means including the yellow strips 41 and the (R-Y) color difference signal produced by means including the cyan strips 42 are spaced from one another by 120 electrical degrees at the frequency of the color carrier wave. In this case, assuming that the phase of the reference frequency wave at the output terminal 32 of the reference frequency generator 29 of FIG. 1 is the phase at which the (R-Y) color difference signal is present in the camera tube output, the phase shifter 39 shifts the phase of the reference frequency wave by 120°.

Figure 3:
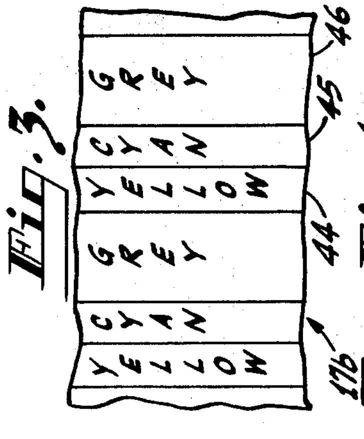
FIG. 3 is a fragmentary portion, greatly enlarged, of another form of a color difference signal encoding filter grating used in the production of color difference signals at 90° phases of the color carrier wave.

Another form of spatial color difference signal encoding filter grating 17*b* is shown in FIG. 3. In this form of the regularly repeating sets of filter strips, there are yellow and cyan strips 44 and 45 having equal widths which are interspersed with neutral gray strips 46 having twice the width of each of the yellow and cyan strips. All of the strips of the filter 17*b* have equal transmissivity for white light so that, as in the case of the filter 17*a* of FIG. 2, the output of the camera tube includes a single suppressed carrier wave having phase and amplitude modulated sidebands constituting the desired color difference signals. In the case of the filter 17*b*, however, the (B-Y) and (R-Y) color difference signals are spaced from one another by 90° at the frequency of the suppressed color carrier wave. Again, assuming that the phase of the reference frequency wave at the output terminal 32 of the reference frequency generator 29 of FIG. 1 to be the phase at which the (R-Y) color difference signal is present in the camera tube output, the phase shifter 39 shifts the phase of the reference frequency wave by 90°.

Figure 4:
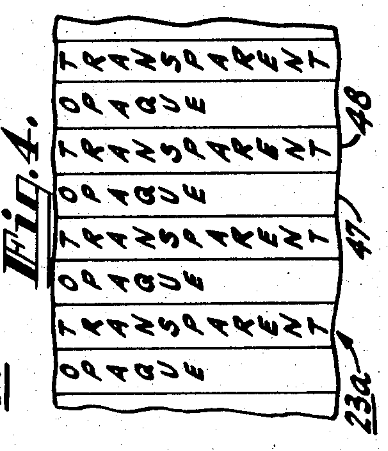
FIG. 4 is a fragmentary portion, greatly enlarged, of one form of an auxiliary signal encoding filter grating used to modify colored light from a constant intensity light source.

In FIG. 4 there is shown one form of auxiliary signal encoding grating 23*a* which may be used with a constant intensity colored light 22 of FIG. 1. The grating 23*a* comprises a plurality of regularly repeating sets of equal width alternate opaque and transparent strips 47 and 48 which modify the colored light from the source 22 so that its interaction with the color difference signal encoding grating 17, in either of the forms shown in FIGS. 2 and 3, produces in the output of the camera tube 15 unmodulated waves occurring as indicated in the frequency spectrum of FIG. 7. In the frequency spectra of FIGS. 7, 8 and 9 the wave frequencies shown by solid lines actually exist in the camera tube output, even though some are not used, and those shown by broken lines are either nonexistent by reason of camera tube resolution limitations, cancellation, or are not used in the operation of the reference frequency generator 29. The number of sets of strips in either of the color difference signal encoding gratings 17*a* and 17*b* of FIGS. 2 and 3 is such that, at the standard line scanning repetition rate used in the United States television systems, sidebands constituting the color difference signals are generated around a color carrier wave Fc of 3.5 Mhz frequency, the carrier wave itself being suppressed as previously explained. The number of sets of strips in the auxiliary signal encoding grating 23*a* of FIG. 4 is such that at the U.S. Standard line repetition rate, an unmodulated auxiliary signal wave F*a* is generated at a frequency of 8.0 Mhz when the grating 23*a* is focused on the photosensitive electrode 16. The camera output frequency spectrum also includes an unmodulated 4.5 Mhz wave (F*a* – F*c*) which is the difference frequency product of the beat between the 3.5 Mhz color carrier frequency *Fc* and the 8.0 Mhz color carrier auxiliary signal wave *Fa*. There also is a 11.5 Mhz sum frequency product (F*a* + F*c*) of the beat between these two frequencies, but it is either beyond the resolution capabilities of the camera tube 15 or, if present, is ignored as not being needed in the practice of the present invention.

FIG. 10 illustrates the manner in which the reference frequency generator 29 of FIG. 1 utilizes the waves shown in the frequency spectrum of FIG. 7 to produce a reference frequency wave for application to the synchronous detectors 35 and 36 to unambiguously recover the (R-Y) and (B-Y) color difference signals. In the form of reference frequency generator shown in FIG. 10 the composite signal derived from the camera tube output which is impressed upon the generator input terminal 31*a* is applied to two narrow band circuits 49 and 51 tuned respectively to 4.5 Mhz, the frequency of the unmodulated beat wave (F*a* – F*c*) and to 8.0 Mhz, the frequency of the auxiliary signal wave F*a*. The 4.5 Mhz and the 8.0 Mhz waves derived from the tuned circuits 49 and 51 are applied to a frequency mixer 52 which produces a 3.5 Mhz output wave constituting the difference between the two applied waves. The 3.5 Mhz wave is passed to the output terminal 32*a* of the reference frequency generator through a narrow band circuit 53 tuned to 3.5 Mhz. The 3.5 Mhz wave at the terminal 32*a* has the frequency of the suppressed color carrier wave Fc, a fixed amplitude which is independent of the content of the subject, and a phase determined by the color of the light emitted by the constant intensity light source 22 of FIG. 1. For the purpose of the present description, it is assumed that the source 22 provides red light, whereby its interaction with the color difference signal encoding grating 17 produces a reference frequency wave at the output terminal 32 of the reference frequency generator 29 which has the phase of the (R-Y) color carrier wave sidebands. It is to be understood that, alternatively, the source 22 could provide cyan light, whereby its interaction with the grating 17 would produce a reference frequency wave which is 180° out of phase with the (R-Y) color carrier wave sidebands, in which case an appropriate phase adjustment of the reference frequency wave would be required.

The use of the auxiliary signal encoding filter grating 23*a* of FIG. 4 produces, not only the desired unmodulated waves from which to derive the proper reference frequency wave for the synchronous demodulation of the color carrier wave sidebands, but also forms an undesired uniform additive color difference signal over the entire field of the picture. This undesired signal can be effectively canceled by applying the 8.0 Mhz auxiliary signal wave F*a* to an envelope detector 54 of FIG. 10, at the output terminal 34*a* of which is produced a pedestal signal of suitable amplitude and polarity to be applied to the appropriate color difference signal terminal 37 or 38 of FIG. 1. In this way, the undesired uniform color difference signal is subtracted from the desired color difference signal. At the same time, any nonuniform illumination of the auxiliary signal encoding grating 23 of FIG. 1 is automatically compensated for because both the average value and the fundamental frequency F*a* of the grating are subject to the same amplitude variations over the entire field.

Another form of the invention, which produces a reference frequency signal by developing lower frequency waves in the camera tube output, employs an asymmetrical auxiliary signal encoding filter grating 23*b*, an illustrative form of which is shown in FIG. 5. In this case, the opaque and transparent strips 55 and 56 respectively are of different widths so that the second harmonic as well as the fundamental of the auxiliary signal wave are generated by the modification of the colored light from the source 22 by the grating 23*b*. In this FIG. the transparent strips 56 are wider than the opaque strips 55, but a reverse arrangement of these strips would produce similar results. The interaction of such modified light wit with either of the color difference signal encoding gratings of FIGS. 2 and 3 produces in the output of the camera tube both signal modulated and unmodulated waves such as shown in the frequency spectrum of FIG. 8. In this case, the number of sets of opaque and transparent strips 55 and 56 of the grating 23*b* is such that the auxiliary signal wave F*a*1 has a frequency of 4.5 Mhz and one of the optical products between the 9.0 Mhz second harmonic auxiliary signal wave 2F*a*1 and the 3.5 Mhz color carrier wave Fc is the wave (2F*al* – Fc) 1 – Fc) which has a 5.5 Mhz frequency.

FIG. 11 illustrates the manner in which the desired reference frequency is developed from the waves having the frequencies shown in FIG. 8 when the camera output is coupled to the input terminal 31*b* of the reference frequency generator. The camera output signal is applied to two narrow band circuits 57 and 58 tuned respectively to 4.5 Mhz, the frequency of the auxiliary signal wave F*a*1, and to 5.5 Mhz, the frequency of the unmodulated beat wave (2F*a*1 – F*c*) produced as one of the optical products referred to previously. The 4.5 Mhz auxiliary signal wave F*a*1 is applied to a frequency multiplier 59 by which its frequency is doubled to produce a wave 2F*a*1 of 9.0 Mhz frequency which is then impressed upon a first frequency mixer 61 together with the beat wave (2F*a*1 – Fc ) of 5.5 Mhz frequency. The difference frequency product of these two waves, which has the 3.5 Mhz frequency of the color carrier wave Fc, that is developed in the output of the mixer 61 is passed through a 3.5 Mhz narrow band tuned circuit 62 to the output terminal 32*b* of this embodiment of the reference frequency generator so that there is available at this terminal a reference frequency wave for the described synchronous demodulation of the (R-Y) and (B-Y) color difference signals. It is to be noted that the highest frequency needed in the camera output circuit is 5.5 Mhz as contrasted to the 8.0 Mhz wave needed for the operation of the apparatus of FIG. 10.

The reference frequency generator of FIG. 11 also includes an envelope detector 63 coupled to the output of the 4.5 Mhz tuned circuit 57 so as to develop a pedestal signal from the auxiliary signal wave F*a*1 for application to the appropriate color difference signal terminal 37 or 38 of FIG. 1 to cancel the undesired uniform additive color difference signal which is produced in this form of the invention as in the previously described embodiment.

One of the advantages of the embodiment of the invention employing the auxiliary signal encoding grating of FIG. 5 and the reference frequency generating apparatus of FIG. 11 is that relatively lower frequencies are used which eases the resolution requirements of the camera tube 15 of FIG. 1. Even though the frequency spectrum of FIG. 8 indicates waves (F*a*1 + Fc) and 2F*a*1 respectively at frequencies of 8.0 Mhz and 9.0 Mhz, it will be recognized that the camera tube does not have to produce such waves in its output because the foregoing description of FIG. 11 demonstrates that the waves F*a*1 and (2F*a*1 – Fc) respectively at frequencies of 4.5 Mhz and 5.5 Mhz are used in the development of the desired reference frequency wave at the 3.5 Mhz frequency of the color carrier wave Fc. There is, however, an undesired wave (F*a*1 – Fc) produced at a 1.0 Mhz frequency by the beat between the 4.5 Mhz auxiliary signal wave F*a*1 and the 3.5 Mhz color carrier wave Fc. This undesired wave appears in the 0 Mhz to 3 Mhz luminance signal band where it would cause an objectionable distortion of a picture reproduced from such a luminance signal.

Such an unwanted wave is effectively canceled by the provision of additional apparatus in the reference frequency generator of FIG. 11. The 5.5 Mhz wave (2F*a*1 – F*c*) derived from the tuned circuit 58 and the 4.5 Mhz wave $Fa1$ derived from the tuned circuit 57 are applied to a second frequency mixer 64 to produce in its output a 1.0 Mhz beat frequency wave $(Fa1-Fc)$ which, after passage through a 1.0 Mhz tuned circuit 65 and an amplitude and polarity control device 66, appears at the compensating signal terminal 33 from which it may be coupled to the input terminal 27 of the low pass filter 26 of FIG. 1 to cancel the unwanted wave from the luminance signal channel.

In another embodiment of the invention no compensation for any undesired additive color difference signal and/or cancellation of an unwanted wave in the luminance signal channel is required and, at the same time, requires only the production of waves of relatively low frequencies in the camera tube output. Such an embodiment utilizes, in addition to either of the color difference signal encoding filter gratings 17*a* and 17*b* of FIGS. 2 and 3, an auxiliary signal encoding filter grating 23*c* such as shown in FIG. 6. This grating also is a color difference type comprising a plurality of regularly repeating sets of alternative additive and subtractive complementary color selective strips such as, for example, the green and magenta strips 67 and 68, respectively. Preferably, the grating 23*c* should have strips which are sufficiently wide to modify the light from the source 22 of FIG. 1 at a relatively low frequency of the order of 0.5 Mhz to 1.0 Mhz, the selected frequency being slightly higher than the desired bandwidth of the color difference signals. For example, where color difference signals of 0.5 Mhz bandwidth are desired, the filter 23*c* may modify the light so as to produce an auxiliary signal wave $Fa2$ in the camera output having a frequency of 0.7 Mhz.

When the filter 23*c* of FIG. 6 is used, the constant intensity light from the source 22 of FIG. 1 should be white and the green and magenta strips 67 and 68 of FIG. 6 should have such densities that they are equally transmissive of the white light so that there will be no resultant AC luminance signal. In other words, the 0.7 Mhz auxiliary signal wave $Fa2$ will not exist as such in the luminance signal portion of the frequency spectrum as illustrated in FIG. 9. Instead, the white light projected through the complementary colored strips, such as the green and magenta strips 67 and 68 of the grating 23*c* of FIG. 6, will generate color signal components which are 180° apart in phase, when imaged through the color difference signal encoding grating 17 of FIG. 1. The relative widths of the green and magenta strips 67 and 68 of the auxiliary signal encoding grating 23*c* can be adjusted so that the average signal component at each polarity is the same so that no carrier wave component is produced, but only sidebands around the suppressed color carrier wave $Fc$, the frequency of which in this case is assumed to be 4.0 Mhz, as indicated in the frequency spectrum of FIG. 9.

The reference frequency generator employing the waves illustrated in FIG. 9 is shown in FIG. 12. These waves, which are impressed upon the input terminal 31*c* as derived from the camera tube output, are applied to narrow band circuits 69 and 71 tuned respectively to 4.7 Mhz and 5.4 Mhz. The first upper sideband wave $(Fc+Fa2)$ of the suppressed color carrier wave $Fc$ derived from the tuned circuit 69 at 4.7 Mhz frequency is applied to a frequency multiplier 72 by which its frequency is doubled to produce a 9.4 Mhz wave $2(Fc+Fa2)$. This wave is impressed upon a frequency mixer 73 which also receives the 5.4 Mhz second upper sideband wave $(Fc+2Fa2)$ from the tuned circuit 71. The difference frequency produce product of the two waves applied to the mixer 73 is an unmodulated wave of 4.0 Mhz which is the frequency of the color carrier wave $Fc$ in this embodiment of the invention. This 4.0 Mhz waves is passed through a narrow band 4.0 Mhz tuned circuit 74 to the output terminal 32*c* of the reference frequency generator from which it is impressed in proper phases upon the synchronous detectors 35 and 36 of FIG. 1 as described previously.

It is seen that, in the form of the invention utilizing the auxiliary signal encoding filter grating 23*c* of FIG. 6 to produce signals as depicted in the frequency spectrum of FIG. 9, the reference frequency generator of FIG. 12 requires no apparatus for the cancellation of signals in either the chrominance or luminance signal passbands. It should be pointed out that, if it is desired to provide the best possible signal to noise ratio of the generated signals, the bandwidths of the tuned circuits used in the three illustrated embodiments of the reference frequency generator of FIGS. 10, 11 and 12 can be made very narrow up to a limit such that the signal information generated by the electron beam scansion of one horizontal line of the raster "rings" into the succeeding line interval, thereby causing phase errors in the succeeding line video signals. If such extreme narrowness of the tuned circuits is desired, the "ringing" can be prevented, or at least minimized so as to render it unobjectionable, by damping the tuned circuits during horizontal retrace intervals. Such damping may be achieved in any one of a number of well known ways such as by the use of a low impedance device (e.g., a transistor) which is gated into operation by the horizontal blanking pulses that are available to blank the electron scanning beam of the camera tube during retrace as is conventional.

It also should be pointed out that the technique of using an auxiliary signal encoding grating to modify a constant intensity light for interaction with a color difference signal encoding grating to produce unmodulated waves by which to generate a reference frequency wave for the unambiguous synchronous demodulation of the phase modulated sidebands of a single suppressed color carrier wave is equally applicable to a two carrier wave color difference system such as that disclosed in the copending Macovski application Ser. No. 517,638, filed Dec. 30, 1965. Where two color difference signal encoding gratings are used to produce the (R-Y) and (B-Y) color difference signals at different frequencies, as in the above-identified copending Macovski application, two reference frequency signals for each color difference carrier wave are required and these reference frequency signals may be developed by any of the three systems disclosed herein. The two reference frequency signals for each color difference carrier wave can then be applied to a phase detector in order to resolve the phase ambiguity existing in the recovered color difference signals because of the suppression of the color carrier wave.

The following claims are directed generically and specifically to the various embodiments of the present invention as applied either to a single suppressed color carrier wave representing two color difference signals at different phases thereof or to one of the suppressed color carrier waves representing one of a plurality of color difference signals at different carrier frequencies.

I claim:

1. In a color television system, an unambiguous color difference signal generating system, comprising:

a camera tube having a photosensitive electrode responsive to light projected thereon and to scansion by an electron beam to produce signals at its output terminal representative of said projected light;

a spatial color difference signal encoding filter grating in the light path between a colored subject and said photosensitive camera tube electrode, said grating having a plurality of sets of subtractive color selective parallel strips extending perpendicular to the scanning direction of said electron beam, all of said strips being equally transmissive of white light so as to produce in the output of said camera tube a suppressed color carrier wave of a frequency $Fc$, first and second phases of which are amplitude modulated by respective color difference signals which may have polarity ambiguities because of said color carrier wave suppression;

a source of constant intensity light;

an auxiliary signal encoding filter grating having a plurality of sets of a parallel strips to modify light projected therethrough at a frequency $Fa$;

optical means for projecting light from said source through said auxiliary signal encoding grating and through said color difference signal encoding grating onto the photosensitive electrode of said camera tube so as to produce in said camera tube output terminal at least two unmodulated waves at respectively different frequencies;

reference frequency generating means coupled to said camera tube output terminal for combining said unmodulated waves to produce an a unambiguous reference frequency wave of fixed amplitude and having said color carrier wave frequency Fc;

first synchronous detecting means coupled to said camera tube output terminal for response to said color difference signal modulated suppressed carrier wave and coupled to said reference frequency generating means for response to said reference frequency wave in a first phase corresponding to said first color carrier wave phase to produce one of said color difference signals with no polarity ambiguity; and second synchronous detecting means coupled to said camera tube output terminal for response to said color difference signal modulated suppressed carrier wave and coupled to said reference frequency generating means for response to said reference frequency wave in a second phase corresponding to said second color carrier wave phase to produce the other of said color difference signals with no polarity ambiguity.

2. In a color television system, an unambiguous color difference signal generating system as defined in claim 1, wherein:

said constant intensity light has such a color that, when modified by said auxiliary signal encoding grating, its interaction with said color difference signal encoding grating produces said different frequency unmodulated waves in said camera tube output in such phases that said reference frequency produced in said reference generating means output has said first phase; and said second synchronous detecting means is coupled to said reference frequency generating means output through a phase shifter to produce said second phase.

3. In a color television system, an unambiguous color difference signal generating system as defined in claim 2, wherein:

said spatial color difference signal encoding filter grating comprises a plurality of regularly repeating sets of three equal width subtractive color selective parallel strips, whereby said first and second phases of said color carrier wave differ by 120° ; and said phase shifter shifts the phase of said reference frequency wave by 120°.

4. In a color television system, an unambiguous color difference signal generating system as defined in claim 2, wherein:

said spatial color difference signal encoding filter grating comprises a plurality of regularly repeating sets of two equal width subtractive color selective parallel strips and a neutral gray strip having twice the width of each of said color selective strips and having white light transmissivity equal to that of said color selective strips, whereby said first and second phases of said color carrier wave differ by 90°; and said phase shifter shifts the phase of said reference frequency wave by 90°.

5. In a color television system, an unambiguous color difference signal generating system as defined in claim 1, wherein: said auxiliary signal encoding filter grating comprises a plurality of regularly repeating sets of alternate opaque and transparent strips to modify the light projected therethrough from said source of constant intensity light at least one frequency higher than said color carrier frequency Fc.

6. In a color television system, an unambiguous color difference signal generating system as defined in claim 5, wherein: the alternate opaque and transparent strips of said auxiliary signal encoding filter grating are of equal widths, whereby said light modification is effected substantially only at a single fundamental frequency higher than said color carrier frequency Fc.

7. In a color television system, an unambiguous color difference signal generating system as defined in claim 5, wherein: the alternate opaque and transparent strips of said auxiliary signal encoding filter grating have respectively different widths, whereby said light modification is effected at a fundamental and its second harmonic frequencies, both of which are higher than said color carrier frequency Fc.

8. In a color television system, an unambiguous color difference signal generating system as defined in claim 1, wherein:

said constant intensity light is white; and said auxiliary signal encoding filter grating comprises a plurality of regularly repeating sets of alternate additive and subtractive color strips, the colors of said strips being complementary and the strips being equally transmissive of said white light, whereby the light modified by said auxiliary signal encoding grating, when projected through said color difference signal encoding grating onto said camera tube photosensitive electrode, produces in said camera tube output two reference signal frequency components having a 180° mutual phase relationship and no resultant AC luminance signal.

9. In a color television system, an unambiguous color difference signal generating system as defined in claim 8, wherein: said alternative additive and subtractive color strips have widths such that said white light is modified at a relatively low frequency which is only slightly higher than the desired bandwidth of the color difference signals, said relative strip widths being such that the average of each of said two reference frequency components is the same, whereby no carrier wave at least relatively low frequency is produced, but only sidebands around said suppressed color carrier wave, said sidebands constituting said unmodulated waves at respectively different frequencies.

10. In a color television system in which is produced, in addition to a band of relatively low frequency luminance signals, a color difference signal which is amplitude modulated on a suppressed carrier wave of a frequency Fc above said luminance signal frequency band by projecting light from a colored subject onto a photosensitive electrode of a camera tube through a color difference signal encoding filter grating, the envelope of said color carrier wave produced in the output of said camera tube by an electron beam scansion of said photosensitive electrode having a polarity ambiguity because of the suppression of said color carrier wave, an unambiguous demodulation system for recovering said color difference signal from said color carrier wave, comprising:

means including an auxiliary signal encoding grating through which constant intensity light, modified at a frequency Fa by said auxiliary signal encoding grating, is projected onto said camera tube photosensitive electrode through said color difference signal encoding grating with which it interacts to produce in said camera tube output at least two unmodulated waves at respectively different frequencies;

reference frequency generating means for combining said unmodulated waves derived from said camera tube output to produce an unambiguous fixed amplitude wave at said color carrier wave frequency Fc; and synchronous detecting means responsive to said color difference signal modulated suppressed carrier wave derived from said camera tube output and to said unambiguous fixed amplitude wave having such phase as to produce an output color difference signal of unambiguous polarity.

11. In a color television system, an unambiguous demodulation system as defined in claim 10; wherein:

said auxiliary signal grating comprises alternate strips of transparent and opaque materials; and said constant intensity light is colored, the particular color determining the phase of said auxiliary signal.

12. In a color television system, an unambiguous demodulation system as defined in claim 11, wherein:

a first one of said unmodulated waves derived from said camera tube output has said frequency Fa which is higher than said color carrier wave frequency Fc, and a second one of said unmodulated waves derived from said camera tube output has a frequency (Fa + Fc) which also is higher than said carrier wave frequency Fc; and said reference frequency generating means includes a frequency mixer responsive to said first and second unmodulated waves to produce said unambiguous fixed amplitude wave having said color carrier wave frequency Fc.

13. In a color television system, an unambiguous demodulation system as defined in claim 11, wherein:

said auxiliary signal grating is of a character to modify said constant intensity light so as to produce in said camera tube output in conjunction with said color difference signal grating a first unmodulated wave having a frequency Fa1 which is higher than said color carrier wave frequency Fc, and a second unmodulated wave having a frequency (2Fa1 − Fc) which also is higher than said color carrier wave frequency Fc; and said reference signal generating means includes frequency multiplying means to double the frequency of said first unmodulated wave to 2Fa1, and a first frequency mixer responsive to said doubled frequency 2Fa1 of said first unmodulated wave and to said second unmodulated wave frequency (2Fa1 − Fc) to produce said unambiguous fixed amplitude wave having said color carrier wave frequency Fc.

14. In a color television system, an unambiguous demodulation system as defined in claim 13, wherein:

the character of said auxiliary signal grating is such that there is produced in said camera tube output an undesired third unmodulated wave having a frequency (Fa1 − Fc) which is lower than said color carrier wave frequency Fc and is within said luminance signal frequency band; and said reference frequency generating means also includes a second frequency mixer responsive to said second unmodulated wave having said frequency (2Fa1 − Fc) and to said unmodulated wave of frequency Fa1 to produce a compensating wave having a frequency (Fa1 − Fc), and means for combining said compensating wave with said luminance signal in such polarity and amplitude to cancel said undesired third unmodulated wave.

15. In a color television system, an unambiguous demodulation system as defined in claim 11, wherein:

the interaction between said constant intensity colored light, modified at said frequency Fa, with said color difference signal encoding grating, in addition to producing said desired unmodulated waves at different frequencies, produces an average component which forms an undesired uniform additive color difference signal over the entire field of the picture; and said reference frequency generating means also includes envelope detecting means responsive to one of said unmodulated waves at said frequency Fa to produce a pedestal signal, and means for combining said pedestal signal with said unambiguously recovered color difference signal in such polarity and amplitude to subtract said undesired signal from said recovered color difference signal.

16. In a color television system, an unambiguous demodulation system as defined in claim 10, wherein:

said constant intensity light is white; and said auxiliary signal grating comprises alternate strips of complementary color selective materials which are equally transmissive of said white light, whereby said white light is modified at a frequency Fa2 which is lower than said color carrier wave frequency Fc and the wave at said frequency Fa2 is suppressed.

17. In a color television system, an unambiguous demodulation system as defined in claim 16, wherein:

the projection of said modified white light at frequency Fa2 through said color difference signal encoding grating onto said camera tube photosensitive electrode produces in the output of said camera tube, by said electron beam scansion of said electrode, a first unmodulated wave of frequency (Fc + Fa2) and a second unmodulated wave of frequency (Fc + 2Fa2), both of which are higher than said color carrier wave frequency Fc; and said reference frequency generating means includes frequency multiplying means to double the frequency of said first unmodulated wave to a frequency 2(Fc + Fa2), and a frequency mixer responsive to said doubled frequency 2(Fc + Fa2) of said first unmodulated wave and to said second unmodulated wave frequency (Fc + 2Fa2 to produce said fixed amplitude wave having said color carrier wave frequency Fc.

UNITED STATES PATENT OFFICE

CERTIFICATE OF CORRECTION

Patent No. 3,566,018 Dated February 23, 197

Inventor(s) Albert Macovski

It is certified that error appears in the above-identified patent and that said Letters Patent are hereby corrected as shown below:

Column 4, line 10, that portion reading "signals" should re -- signal --. Column 5, line 12, delete "color carrier". Column 6, line 7, delete "wit"; line 16, delete (second occurrence) "1 - Fc)"; line 61, that portion reading "that waves" should read -- that only the waves --. Column 7, li 20-21, that portion reading "alternative" should read -- al nate --; line 65, delete "produce".

Signed and sealed this 10th day of August 1971.

(SEAL)
Attest:

EDWARD M.FLETCHER,JR.
Attesting Officer

WILLIAM E. SCHUYLER, JR.
Commissioner of Patents